April 1, 1958 — I. E. SCHRECK — 2,829,274

TRACING DEVICE

Filed July 31, 1952

INVENTOR.
IRVING E. SCHRECK
BY
Oberlin + Limbach
ATTORNEYS.

United States Patent Office 2,829,274
Patented Apr. 1, 1958

2,829,274

TRACING DEVICE

Irving E. Schreck, Cleveland, Ohio

Application July 31, 1952, Serial No. 302,007

8 Claims. (Cl. 250—106)

This invention relates to tracing devices, and more particularly to an electronic tracing device adapted to automatically track a line drawing of a predetermined shape or pattern.

Within comparatively recent years various electronic tracing devices have been developed to supplant the mechanical and magnetic template tracers commonly used in the guidance control of tools such as flame cutters, welding torches, grinding tools, and the like. While these devices differ in specific detail, they all, insofar as I am aware, employ light sensitive means, usually a photoelectric cell, as the condition responsive element of the electronic circuit and create an artificial lighting condition adapted to vary with departures of the tracer from the prescribed tracing path. The tracer, which is mounted for driven movement in all directions relative to a supported pattern, requires a source of light generally in the form of a small electric light bulb, and optical focusing means to converge the rays from such bulb into a small light spot capable of tracking the pattern representation employed. The light spot must track against a side of the representation to impart a directional sense to any deviation therefrom, and it is therefore necessary to use either a silhouette or a relatively wide line drawing of the pattern. The photoelectric cell, also carried by the tracer, is disposed to receive reflected light from the outline, and in order to reduce the possibility of outside light interference, the cell and the light spot are shielded by the tracer structure. As a result, it is impossible for an operator to observe the light spot on the outline and special indicating or observation means must be provided. Smudges of dirt and the like on the outline, not uncommon in shop practice, result in the photoelectric cell transmitting a false signal and thereby destroy the control effect. The output of the photo cell is matched against a mechanical force and the resultant employed to control the direction of the tracer movement. A relatively wide departure of the light spot from the outline side is required to produce a response capable of commanding a corrective change in the direction of the tracer movement.

It is a primary object of my invention to avoid the inherent limitations of a photoelectric system and yet provide the advantages of electronic control by using radio-activity as the variable control condition. To this end my invention contemplates the use of a radioactive outline of the pattern to be reproduced and radioactive sensitive means for controlling the direction of tracer movement. Since the control radiations are obtained from the outline itself, there is no need for a separate source of energy, which would of course be subject to failure during a working operation. Furthermore, the use of a radioactive outline eliminates the need for extensive shielding since the possibilty of outside interference is negligible.

It is also an object of my invention to provide in conjunction with a radioactive outline a plurality of radioactive sensitive elements whereby movement of said elements with respect to the outline may be instantaneously detected.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
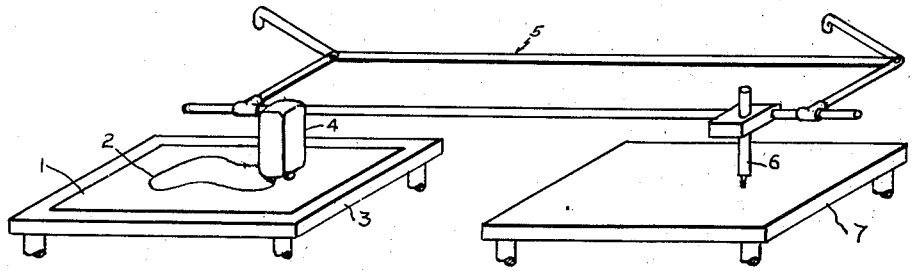
Fig. 1 is a perspective view of my tracing device in operative association with a reproducing instrument.

One manner in which the present electronic tracing devices are applied to the guidance control of a reproducing tool or instrument is illustrated in Fig. 1, wherein 1 indicates a background having a pattern outline 2 thereon. The background 1 is supported, preferably in a horizontal plane, by means of a table 3. Mounted above the table 3 for universal movement in a plane adjacent and parallel thereto is a tracer 4 which is operatively connected by means of a pantograph structure 5 to a reproducing tool 6. This reproducing tool may be a flame cutter, welding head, grinder or abrader, or any other type of tool which may desirably be controlled to follow a pattern outline. The work-piece 7 upon which the pattern is to be reproduced is supported adjacent the tool 6.

The tracer 4 comprises a casing 8 containing the mechanical operating means whereby it may be driven and automatically steered. The depicted means for driving the tracer relative to the outline comprises a hollow shaft 9 which is rotatably mounted within casing 8 in any suitable manner and which supports the axis 10 for a power driven wheel 11. Wheel 11 is adapted to frictionally engage the outline 1 to thereby produce relative movement, and is driven by means of a gear 12 fixed to the wheel and engaging worm gear 13 which in turn meshes with worm 14 secured to shaft 15. A conventional motor 16 is provided for driving shaft 15 which is rotatably contained within the hollow shaft 9.

The direction of the tracer movement may be controlled by rotating the shaft 9 and hence the wheel 11 about the longitudinal axis of the shaft, and this may be accomplished by means of a worm wheel 17 fixed to the shaft 9 and meshing with a drive worm 18. Drive worm 18 is mounted upon a shaft 19 driven by a reversible motor 20 and supported at its free end by means of a bearing 21.

The structure above described is generally known and does not form a part of the instant invention. My invention as set forth hereinbelow concerns the manner in which reversible motor 20 is automatically controlled to continuously direct the movement of the tracer 4 in a path following the pattern outline.

In the preferred embodiment of my invention two radioactive sensitive elements 22 are mounted in side-by-side relation within the tracer casing 8 and are adapted to be located adjacent the surface of the outline 2. These radiation detection elements may be of any commercially available variety, such as the well-known Geiger counter tubes, ionization chambers, or Ohmart cells. The only requirement for such elements is that they be capable of detecting radiations and producing an electrical output dependent upon the radiations detected. Also in accordance with my invention, the outline 2 is radioactive, that is, it has the property of spontaneously emitting radiations in the form of alpha, beta and gamma rays. Such an outline may be prepared in any suitable fashion and may comprise a substance which is naturally radioactive, such as radium, actinium or thorium compounds, or one in which radioactivity has been induced. From the standpoint of expense and convenience, the background 1 is preferably of paper, cardboard or the like, and the outline 2 is drawn thereon with a drawing instrument such as a conventional lead pencil which has been rendered radioactive through the bombardment thereof with atomic particles in well-known manner.

Figure 3:
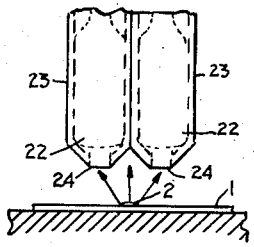
Fig. 3 is a greatly enlarged view showing the normal operating relationship between the tracer detection elements and the outline.
Figure 2:
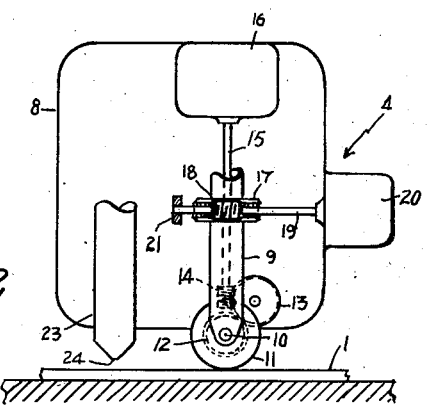
Fig. 2 is a partially diagrammatic side view of the tracer showing the manner in which the tracer is driven and steered.

As shown in Fig. 3, the elements 22 are normally disposed adjacent the respective edges of the radioactive outline 2 to thereby detect substantially equal amounts of radiation from the side portions of the outline. The elements 22 are mounted within suitable tubes 23 which are partially closed at the lower extremities thereof and provided at such points with apertures 24 designed to expose a portion of each element 22. The apertures 24 are preferably in the form of slits, normally perpendicular to the outline, and the tubes 23 are preferably made of lead or other suitable shielding material. By this construction radiations from the outline sections to the front and rear of the apertures 24 are effectively prevented from influencing elements 22. It is to be noted that the mounting of the elements 22 maintains the same in spaced-apart relation each to the other and it will be appreciated that a lateral movement of the elements relative to the outline will result in an increase in the radiation detected by one such element and a simultaneous decrease in the radiation detected by the other such element. By using two detection elements in this manner it is therefore possible to obtain an instantaneous detection of any movement of the tracer away from the path of the outline.

Figure 4:
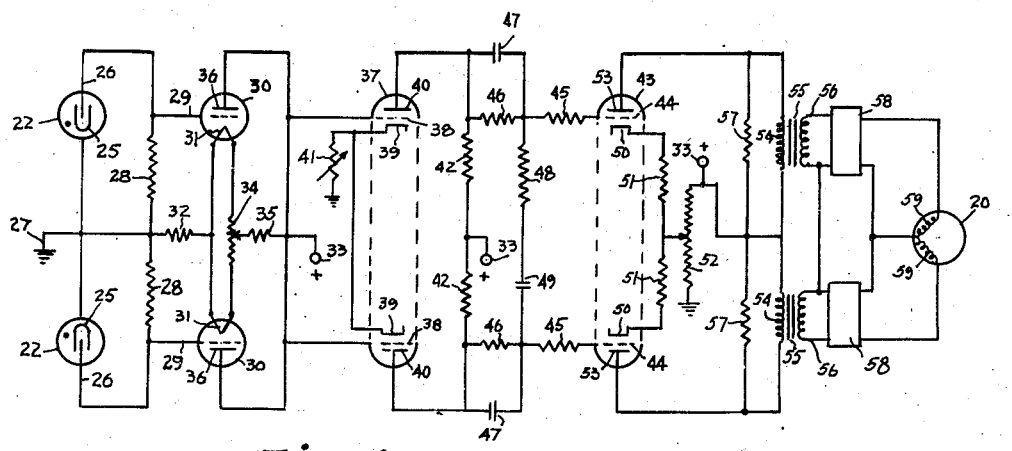
Fig. 4 is a circuit diagram of the electronic system utilized with my tracing device.

The electronic circuit for relating the detection elements 22 and the tracer steering motor 20 is shown in Fig. 4, in which the illustrated detection elements 22 are of the Ohmart cell type. These cells are identical and each comprises a cathode 25 and an anode 26 maintained in a gaseous atmosphere. Cathodes 25 are connected to a suitable ground, as at 27, and anodes 26 are likewise grounded through relatively high resistances 28. If it is desired to use Geiger counter tubes or ionization chambers in place of the Ohmart cells, a suitable source of voltage supply would be provided in known manner, for example, by the insertion of a battery in the cathode to ground circuit with the negative battery terminal connected to the cathode.

Anodes 26 of the detection elements 22 are also connected to grids 29 of respectively associated electronometer tubes 30. Several types of electronometer tubes, which are characterized in part by the fact that they draw a very small grid current, are commercially available and may be optionally used in this stage of the circuit. Filaments 31 of the illustrated tubes 30 are grounded through a common bias resistor 32 and connected to a voltage supply terminal 33 through resistors 34 and 35. Terminal 33 also provides the supply voltage for the plates 36 of the electronometer tubes. The output of each tube 30, which is controlled by the grid excitation thereof in response to the signal produced by the associated detection element 22, is applied to a conventional vacuum tube amplifier 37 having two amplifying sections each comprising a grid 38, cathode 39 and anode 40. Resistor 41 provides the bias voltage for this amplifier, and the anodes 40 are connected to supply terminal 33 through resistors 42.

The control signals are further amplified by a second vacuum tube amplifier 43 of conventional type which also has two amplifying sections. Coupling between the grids 44 of such sections and the anodes 40 of amplifier 37 is accomplished by resistance-capacitance networks comprising resistors 45, 46 and condensers 47, with resistors 46 in parallel with such condensers. These networks operate as filters to attenuate undesirable rapid fluctuations and signals which are due to tube noise and other extraneous sources. Resistor 48 and condenser 49 provide a cross-feed between the two sections of amplifier 37 which further reduces the transient signals in one side by permitting them to reach the opposite side of the amplifier. Cathodes 50 of amplifier 43 are connected through resistors 51 to a mid-point on resistor 52 which is grounded at one end and connected at the other end to supply terminal 33. Anodes 53 are also connected to supply terminal 33.

Across each section of amplifier 43 is the primary coil 54 of a transformer 55 having a secondary coil 56. The primary coils 54 are bridged by resistors 57 to thereby provide a critical dampening. Secondaries 56 are connected to power amplifiers 58 which in turn are connected to the respective opposed field windings 59 of the reversible steering motor 20. Amplifiers 58 are provided to increase the strength of the control signals to a level which will operate the armature of motor 20, and any conventional power amplifier, such as a magnetic amplifier, amplydine, thyratron circuit of power vacuum tube amplifier, may be used for this purpose.

As stated in the foregoing, the radioactive sensitive elements 22 are normally disposed to detect substantially equal amounts of radiation from the respective side portions of the radioactive outline 2. This condition is shown in Fig. 3 and, at the beginning of a tracing operation, the tracer 4 will be positioned to locate the elements 22 relative to the outline in the manner there illustrated. Drive motor 16 is then energized to impart forward movement to the tracer by means of the wheel 11 in contact with the outline, and as long as elements 22 maintain their normal prescribed position with respect to the outline, the amplified control signals applied by the circuit of Fig. 4 to the field windings 59 of the steering motor will be equal and such motor will remain stationary. If, however, the tracer 4 departs from the outline path, the radiation detected by the respective elements 22 and hence the output signals thereof will cumulatively change in the manner previously described thereby causing unequal excitation of the grids 29 of electronometer tubes 30. As a result, such tubes will conduct unequally and therefore one field winding 59 will be energized to a greater degree than the other, and steering motor 20 will rotate. The direction of steering motor rotation is of course dependent upon which field winding is predominately energized, and it is obvious that an increase in the output signal of one of the detection elements 22 will denote a departure from the outline 2 in one direction while an increase in output signal of the other element 22 will denote a departure in the opposite direction. The field windings 59 may therefore be readily associated with the respective detection elements so that the power driven wheel 11 of the tracer 4 when rotated by the steering motor will always be directed toward the pattern outline, that is, opposite to the direction of tracer departure from the outline. The tracer 4 will therefore be continuously and accurately guided to follow the outline and hence cause the reproducing tool or instrument to describe a similar outline on the work-piece.

It will be apparent that my invention is not limited to use with any particular mechanical means for driving the tracer over the outline or for operatively connecting the tracer with the reproducing instrument, and that it may be advantageously employed with any automatic tracing apparatus.

Other modes of applying the principle of the invention may be employed, change being made as regards the details described, provided the features stated in any of the following claims, or the equivalent of such, be employed.

I therefore particularly point out and distinctly claim as my invention:

1. A tracing device adapted to control the movement of a reproducing tool in accordance with a predetermined pattern, which comprises a radioactive outline of such pattern, a tracer mounted for universal movement in a plane parallel to the surface of the outline, propelling means for said tracer including a rotating element frictionally engaging such outline, means operative to drive said rotating element whereby the tracer will move relative to the outline, steering control means for said tracer operative to control the direction of tracer movement, a pair of radioactive sensitive elements carried by said tracer in spaced relation and adapted to be normally disposed adjacent the respective edges of such outline, whereby such elements will normally detect substantially equal amounts of radiation from the outline edge portions and lateral movement of said tracer with respect to the outline will result in an increase in the radiation detected by one of such elements accompanied by a decrease in the radiation detected by the other of such elements, circuit means associated with each such element adapted to produce a voltage signal the magnitude of which is variable in accordance with the amount of radiation detected, means amplifying the respective voltage signals, a reversible motor having opposed field windings, connecting means operative to apply the amplified voltage signals to such respective field windings whereby lateral movement of said radioactive sensitive elements relative to such outline will cause said motor to rotate, and means operably connecting said motor with said tracer steering control means to continuously direct the tracer movement in a path following the radioactive outline.

2. A tracing device adapted to control the movement of a reproducing tool in accordance with a predetermined pattern, which comprises a radioactive outline of such pattern, a tracer mounted for universal movement in a plane parallel of said outline, means operative to drive such tracer in said plane, steering control means operative to control the direction of tracer movement, a pair of radioactive sensitive elements carried by said tracer in spaced apart relation and adapted to be normally disposed adjacent the respective edges of such outline, whereby such elements will normally detect substantially equal amounts of radiation from the outline edge portions and lateral movement of said tracer with respect to the outline will result in an increase in the radiation detected by one of such elements and a simultaneous decrease in the radiation detected by the other of such elements, circuit means adapted to produce voltage signals in response to the radiation thus respectively detected, a reversible motor, means applying such voltage signals to said motor whereby an unbalance in such signals will cause the motor to rotate, and means operably connecting such motor with said tracer steering control means to direct the tracer movement relative to the radioactive outline.

3. A tracing device adapted to control the movement of a reproducing tool in accordance with a predetermined pattern, which comprises a radioactive outline of such pattern, a tracer mounted for universal movement relative to said outline, drive means operative to move said tracer, means operative to control the direction of such tracer movement, a pair of radioactive sensitive elements carried by said tracer in spaced apart relation and adapted to be normally disposed adjacent the respective edges of such outline, circuit means associated with each said element adapted to produce a voltage signal in response to the thus detected radiation, and means operative to actuate said means controlling the direction of tracer movement in response to an unbalance in said voltage signals whereby such tracer will be caused to move in a path following the radioactive outline.

4. A tracing device adapted to control the movement of a reproducing tool in accordance with a predetermined pattern, which comprises a radioactive outline of such pattern, a tracer mounted in a plane parallel to said outline, power driven means operative to produce relative movement between said tracer and said outline, steering means for said power driven means operative to control the direction of such relative movement, a pair of radioactive sensitive elements carried by said tracer in spaced apart relation and adapted to normally detect substantially equal amounts of radiation from the respective edges of such outline, circuit means associated with each said element adapted to produce a voltage signal in response to the thus detected radiation, and means operative to control said steering means in response to an unbalance in said voltage signals whereby the relative movement between said tracer and said outline will be continuously directed in a path following the outline.

5. A tracing device comprising a radioactive outline of the shape to be traced, a radioactive sensitive element supported adjacent said outline and adapted to detect radiations emanating therefrom, means operative to move said element relative to said outline, and directional control means responsive to the thus detected radiation for steering said element in a path following the outline.

6. The method of tracing which comprises preparing a radioactive line drawing, supporting such drawing in a planar surface, moving a tracer over the drawing in a plane parallel thereto, and controlling the direction of tracer movement in response to the radiations emitted by the drawing.

7. A tracing device adapted to control the movement of a reproducing tool in accordance with a radioactive outline, comprising a tracing head mounted for universal movement, drive means therefor, steering means operative to control the direction of tracing head movement, radioactive sensitive means carried by said head adapted to detect radiations emanating from such outline, circuit means for providing a significant electrical signal in response to and variable with changes in the radiation detected, and means for controlling operation of said steering means responsively to the signal thus produced so that the tracing head when driven over the outline will be caused to track the latter.

8. A tracing device adapted to control the movement of a reproducing tool in accordance with a radioactive line drawing, comprising a tracing head mounted for universal movement, drive means therefor, steering means operative to control the direction of tracing head movement, a pair of radioactive sensitive elements carried by said head in laterally spaced-apart relation and adapted to be normally disposed respectively adjacent the sides of such radioactive line, circuit means associated with each such sensing element adapted to produce a significant electrical signal in response to the radiation detected thereby, and means for controlling the operation of said steering means responsively to the signals thus produced so that the tracing head when driven over the drawing will be caused to track the same.

References Cited in the file of this patent

UNITED STATES PATENTS

| | | |
|---|---|---|
| 2,121,211 | Padva | June 21, 1938 |
| 2,172,313 | Young | Sept. 5, 1939 |
| 2,261,644 | Cockrell | Nov. 4, 1941 |
| 2,370,163 | Hare | Feb. 27, 1945 |
| 2,489,305 | McLennan | Nov. 29, 1949 |
| 2,499,889 | Teichmann | Mar. 7, 1950 |
| 2,503,052 | Keinath | Apr. 4, 1950 |
| 2,522,851 | Tyrner | Sept. 19, 1950 |